United States Patent [19]

Nakayama et al.

[11] Patent Number: 4,813,687
[45] Date of Patent: Mar. 21, 1989

[54] GASKET ASSEMBLY

[75] Inventors: Takashi Hisatomi, Yokohama; Shyouzabu Ura, Fujisawa, all of Japan

[73] Assignee: Nissan Corporation, Japan

[21] Appl. No.: 107,917

[22] Filed: Oct. 13, 1987

Related U.S. Application Data

[63] Continuation of Ser. No. 776,148, Sep. 13, 1985, abandoned.

[30] Foreign Application Priority Data

Sep. 17, 1984 [JP] Japan ................................ 59-192611

[51] Int. Cl.⁴ .............................................. F16J 15/10
[52] U.S. Cl. ...................................... 277/26; 277/166; 277/233; 277/235 B
[58] Field of Search ...................... 277/235 B, 166, 26, 277/232, 234, 233, 235 R

[56] References Cited

U.S. PATENT DOCUMENTS

| | | | |
|---|---|---|---|
| 1,823,284 | 9/1931 | Oven | 277/232 |
| 1,927,450 | 9/1933 | Balfe | 277/234 X |
| 1,948,252 | 2/1934 | Bailey | 277/233 X |
| 2,071,322 | 2/1937 | Balfe | 277/235 B X |
| 2,126,716 | 8/1938 | Balfe | 277/232 |
| 2,197,916 | 4/1940 | Balfe | 277/233 X |
| 2,211,045 | 8/1940 | Balfe | 277/232 X |
| 4,072,316 | 2/1978 | Decker et al. | 277/166 X |
| 4,204,691 | 5/1980 | Takase et al. | 277/235 B |
| 4,276,539 | 3/1983 | Baldacci | 277/235 B X |
| 4,287,904 | 6/1983 | Nicholson | 277/235 B |
| 4,402,518 | 9/1983 | Locacius | 277/235 B X |

FOREIGN PATENT DOCUMENTS

| | | | |
|---|---|---|---|
| 22882 | 12/1968 | Australia . | |
| 2701603 | 7/1978 | Fed. Rep. of Germany | ... 277/235 B |
| 3224676 | 1/1984 | Fed. Rep. of Germany | ... 277/235 B |
| 58-9304 | 2/1983 | Japan . | |
| 2121123 | 12/1983 | United Kingdom | ............ 277/235 B |

Primary Examiner—Allan N. Shoap
Attorney, Agent, or Firm—Leydig, Voit & Mayer

[57] ABSTRACT

An improved gasket assembly comprising a first gasket member, a second gasket member, and an intermediate metal plate interposed between and temporarily and slidably attached to the first and second gasket members. The intermediate metal plate may be attached to the gasket members by either a plurality of hooks formed on the intermediate metal plate or a low temperature melting point adhesive applied to the respective sides of the intermediate metal plate.

3 Claims, 2 Drawing Sheets

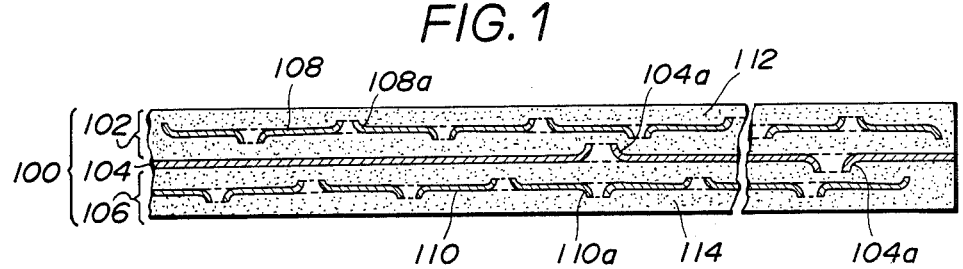
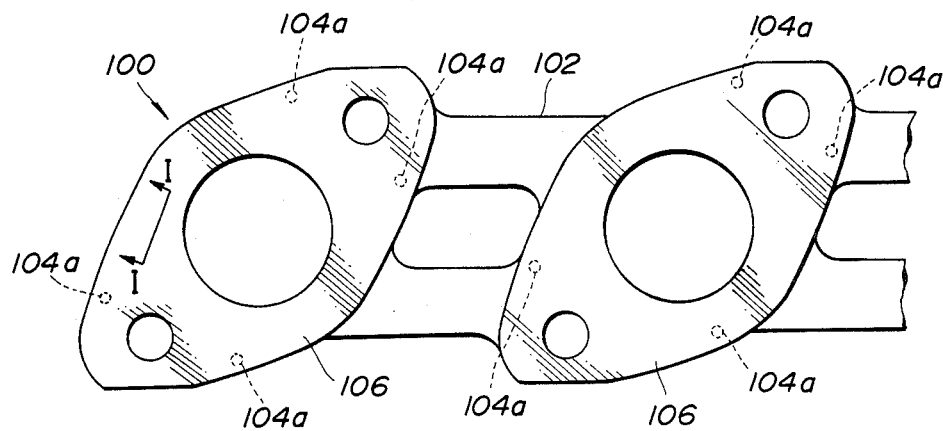
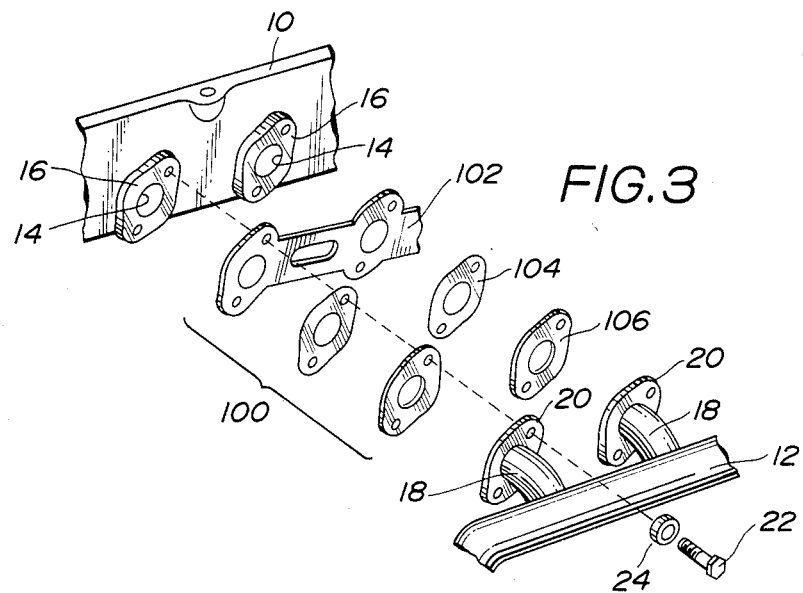

4,813,687

GASKET ASSEMBLY

This application is a continuation of application Ser. No. 776,148, filed Sept. 13, 1985, now abandoned.

BACKGROUND OF THE INVENTION

1. Field of the Invention

The present invention relates in general to a gasket assembly for making a pressure-tight joint between two parts, and more particularly, to a gasket assembly interposed between the cylinder head and exhaust manifold of an internal combustion engine.

2. Description of the Prior Art

Various kinds of gaskets have been proposed and put into practical use for achieving a pressure-tight joint between the cylinder head and exhaust manifold of an internal combustion engine. However, due to their inherent construction, conventional gaskets have suffered from the drawback that the inevitable thermal expansion of the exhaust manifold, which is greater than that of the cylinder head, is not absorbed by the gaskets so that, in the extreme case, the exhaust manifold and/or the connecting bolts used for connecting the manifold to the cylinder head are cracked or broken. One type of conventional gasket suffering from this drawback will be described hereinafter for clarification of the invention.

SUMMARY OF THE INVENTION

It is an object of the present invention to provide an improved gasket assembly which is free of the above-mentioned drawback.

According to the present invention, there is provided a gasket assembly which is constructed to allow sliding movement therein.

In accordance with the present invention, there is provided a gasket assembly which comprises a first gasket member, a second member, an intermediate metal plate interposed between the first and second gasket members, and means for temporarily and slidably attaching the first and second gasket members to respective sides of the intermediate metal plate in such a manner that a relative sliding occurs between the intermediate metal plate and each of the first and second gasket members when a predetermined degree of force is applied therebetween.

BRIEF DESCRIPTION OF THE DRAWINGS

Other objects and advantages of the present invention will become apparent from the following description in conjunction with the accompanying drawings, in which:

FIG. 1 is a partial sectional view taken along the section line 1—1 in FIG. 2, of a gasket assembly of a first embodiment of the present invention;

FIG. 2 is a plan view of a part of the gasket assembly of the first embodiment;

FIG. 3 is an exploded view of the gasket assembly with a cylinder head and an exhaust manifold, which are partially shown;

DESCRIPTION OF A CONVENTIONAL GASKET

Prior to describing the invention in detail, one type of conventional gasket will be described with reference to FIGS. 5 to 8 in order to clarify the object of the present invention, which is disclosed in Japanese Patent Application Second Provisional Publication No. 58-9304.

Figure 5:
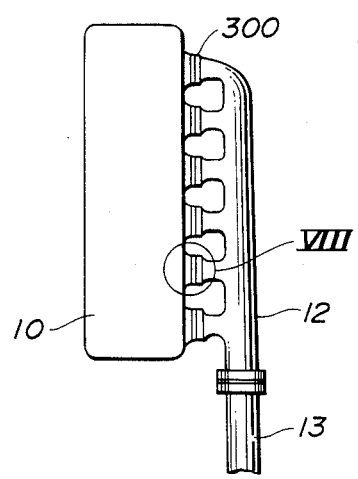
FIG. 5 is a plan view of a cylinder head and an exhaust manifold which are bolted with conventional gaskets therebetween.
Figure 6:
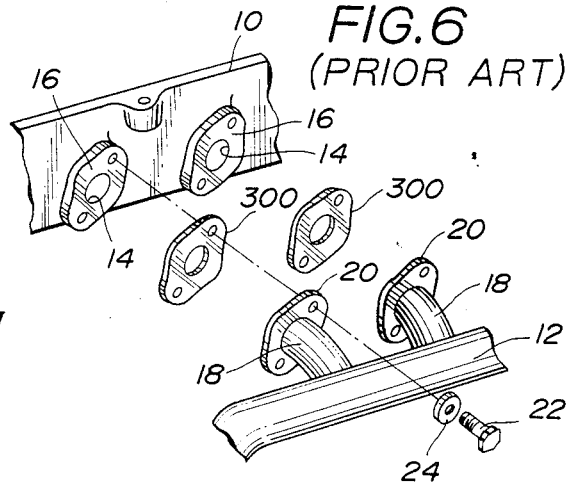
FIG. 6 is a view similar to FIG. 3, but showing conventional gaskets between the cylinder head and the exhaust manifold.

FIGS. 5 and 6 show the manner in which the conventional gaskets 300 are employed for making a pressure-tight joint between a cylinder head 10 and exhaust manifold 12 of an internal combustion engine. An exhaust pipe, denoted by numeral 13 in FIG. 5, extends from the exhaust manifold 12. As is seen from FIG. 6, each exhaust port 14 of the cylinder head 10 and each branch 18 of the exhaust manifold 12 are formed with flanges 16 and 20, respectively, which are bolted to each other with the gasket 300 therebetween. A bolt 22 and a washer 24 are used for securing the flanges 16 and 20 and the gasket 300. The flanges 16 and 20 and the gasket 300 are each formed with two spaced holes (no numerals) through which the connecting bolts 22 pass.

Figure 7:
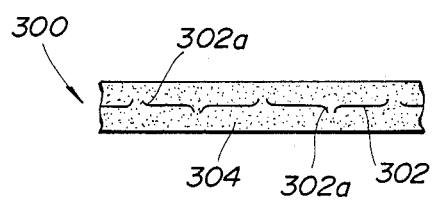
FIG. 7 is a partial sectional view of the conventional gasket.

FIG. 7 shows a section of the conventional gasket 300. As is seen from this drawing, the gasket 300 comprises a core steel plate 302 formed with a plurality of hooks (or open bosses) 302a on each side and a packing sheet member 304 of heat resisting deformable material which envelopes the core steel plate 302. Carbongraphite, asbestos, or the like may be used as the material of the packing sheet member 304. Usually, to manufacture the gasket 300, two identical layers of the heat resisting deformable material are put on the respective sides of the steel plate 302 and pressed upon the plate so that the hooks 302a are stuck into the layers and lock them to the plate. A drawback inherent to this construction will be described with reference to FIG. 8.

Figure 8:
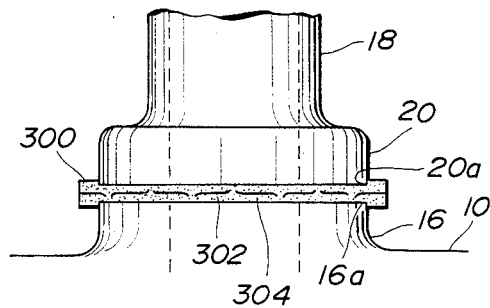
FIG. 8 is an enlarged view of the part indicated by the arrow VIII of FIG. 5.

As is seen from FIG. 8, upon assembly, the outside edges 16a and 20a of the flanges 16 and 20 are depressed into the gasket 300 and make a locking connection between the gasket 300 and each flange 16 or 20. This condition does not allow for any relative displacement between the gasket 300 and the flange 16 or between the gasket 300 and the other flange 20. Thus, flange 16 is locked in fixed relation to flange 20, and the longitudinal expansion and contraction of the exhaust manifold 12 relative to the cylinder head 10, caused by temperature change, creates great stress in both the exhaust manifold 12 and the bolts 22. If the longitudinal expansion and contraction of the exhaust manifold 12 is completely suppressed and great stress is generated in the manifold, experiments have revealed that the stress remains in the exhaust manifold 12 and results in an irreversible shrinkage of the manifold after long use. If the shrinkage exceeds the space defined between each connecting bolt and the associated bolt hole of the exhaust manifold, interference occurs between the connecting bolt and the exhaust manifold and, in the extreme case, the weaker one of them is broken.

DETAILED DESCRIPTION OF THE INVENTION

Referring to FIGS. 1 to 3, there is shown a gasket assembly 100 of a first embodiment of the invention.

As is seen from the exploded view of FIG. 3, the gasket assembly 100 of the present invention comprises generally three major parts or groups; an elongate gasket member 102 having a length sufficient for connecting the distantmost two flanges 16 of the cylinder head 10, a plurality of rhombic metal plates 104 attached to the elongate gasket member 102 at certain intervals, and a plurality of rhombic gasket members 106 respectively attached to the metal plates 104. Upon assembly, these three parts or groups 102, 104, and 106 form a generally three-layered construction shown in FIG. 4 as will become apparent as the description proceeds.

As is best understood from FIG. 3, the elongate gasket member 102 has a plurality of axially spaced enlarged portions (no numerals) which are sized and arranged to be respectively mated with the flanges 16 of the cylinder head 10. The rhombic metal plates 104 and the rhombic gasket members 106 are attached to the corresponding enlarged portions of the elongate gasket member 102.

As is seen from FIG. 1, the elongate gasket member 102 and each rhombic gasket member 106 may have substantially the same construction as the conventional gasket 300. Each of the gasket members 102 and 106 comprises a core steel plate 108, 110 formed with a plurality of hooks (or open bosses) 108a, 110a and a packing sheet member 112, 114 of heat resisting deformable material in which the core steel plate 108, 110 lies. The elongate gasket member 102 and rhombic gasket members 106 may be manufactured in the manner described above. Preferably, the thickness of each gasket member 102, 106 is about 1.2 mm.

Each metal plate 104 is preferably constructed of steel 0.2 mm in thickness. The metal plate 104 may be formed with several hooks (or open bosses) 104a on each side, but when such a construction is utilized, the number of the hooks 104a per unit area on the metal plate must be less than the number of hooks 102a, 106a per unit area on the core steel plates 102, 106 within the elongate gasket member 102 and rhombic gasket member 106, as is shown in FIG. 1.

When constructed in this manner, the gasket assembly is formed by respectively putting the metal plates 104 on the enlarged portions of the elongate gasket member 102, respectively putting the rhombic gasket members 106 on the metal plates 104 and then pressing both the gasket members 102 and 106 against the metal plates 104 causing the hooks 104a of the metal plates 104 to stick into the gasket members 102 and 106. The metal plates 104 are thus weakly bonded to the elongate gasket member 102 and the rhombic gasket members 106 to form a three-layer configuration with small bonding forces.

Once assembled in the above-described manner, the gasket assembly is installed between the cylinder head 10 and the exhaust manifold 12 with the enlarged portions of the elongate gasket member 102 respectively mated with the flanges 16 of the cylinder head 10 and the rhombic gasket members 106 respectively mated with the flanges 20 of the exhaust manifold 12. Suitable numbers of connecting bolts 22 and washers 24 are used for combining these parts, and bolt holes (no numerals) are formed in the flanges 16 of the cylinder head 10, the gasket assembly 100, and the flanges 20 of the exhaust manifold 12, as shown in FIG. 3.

It is to be noted that, as shown in FIG. 3, hooks 104a of he metal plate 104 are of such number, size, and construction as to catch the gasket members 102 and 106 only weakly. This weak bond is to facilitate handling when the gasket assembly 100 is mounted to the engine. The hooks 104a are constructed to give susbstantially no resistance to relative displacement between the metal plate 104 and each of the gasket members 102 and 106.

It is to be noted that utilization of the elongate gasket member 102 as a part of the gasket assembly 100 is to facilitate handling during mounting on the engine, while utilization of the separate rhombic gasket members 106 is to allow effective absorption of the longitudinal expansion and contraction of the exhaust manifold 12 relative to the cylinder head 10.

When the engine is under high-load operation, the temperature of the cylinder head 10 is controlled to about 80 to 100 degrees Centrigrade by the cooling water flowing therein, while the temperature of the exhaust manifold 12 is raised to about 800 to 900 degrees Centrigrade by exhaust gases. Due to this temperature difference between these two parts, they tend to expand different amounts and relative displacement tends to occur between them, particularly in the direction along which the cylinders of the engine are aligned. The gasket assembly 100 of the present invention allows this relative displacement to induce corresponding sliding between each metal plate 104 and each of the gasket members 102 and 106 because of the weak connection with the metal plates 104 therebetween. It is to be noted that this sliding occurs even when the peripheral edges of the flanges 16 and 20 are depressed into the gasket assembly 100. The longitudinal expansion and contraction of the exhaust manifold 12 is thus permitted and no stress develops in the exhaust manifold 12 and the undesirable cracking and/or breakage of the exhaust manifold 12 and the connecting bolts 22, which has been observed when the conventional gasket 300 is used, is avoided.

Figure 4:
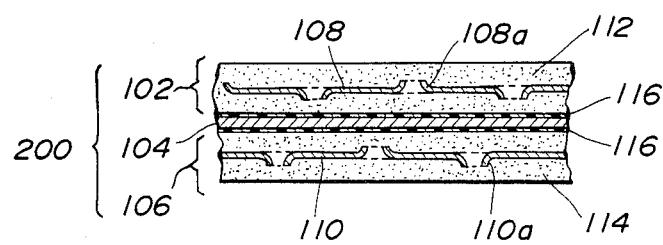
FIG. 4 is a partial sectional view taken in similar manner as that in FIG. 1, of a gasket assembly of a second embodiment of the present invention.

Referring to FIG. 4, there is shown a second embodiment of the present invention. The gasket assembly 200 of this second embodiment comprises substantially the same elements as those in the first embodiment except for the means by which the elongate gasket member 102 and the rhombic gasket members 106 are temporarily fixed to the rhombic metal plates 104. In this second embodiment, the rhombic metal plates 104 are free of hooks, and a low melting point adhesive 116, such as "wax", is used to temporarily fix the gasket members 102 and 106 to the metal plates 104. The high temperature of the exhaust manifold 12 during operation of the engine will melt the adhesive 116 thereby permitting sliding between each metal plate 104 and each of the gasket members 102 and 106. Thus, as in the case of the first embodiment, the expansion and contraction of the exhaust manifold 12 does not cause cracking and/or breakage of the exhaust manifold 12 and the connecting bolts 22.

Although only two embodiments have been described in the foregoing description, many modifications are available to those skilled in the art without departing from the scope of the present invention which is defined in the claims.

What is claimed is:

1. A gasket assembly for making a pressure-tight joint between a cylinder head of an engine and an exhaust manifold when clamped therebetween, comprising:

an elongate gasket member having a length sufficient for connecting spaced exhaust ports formed in said cylinder head, said elongate gasket member being formed with enlarged portions at positions corresponding to said exhaust ports of the cylinder head;

a plurality of smaller gasket members respectively mounted to said enlarged portions of said elongate gasket member;

a plurality of smaller intermediate metal plates, each being interposed between one of said enlarged portions of the elongate gasket member and the associated one of said smaller gasket members; and means for releasably attaching both said enlarged portions of the elongate gasket member and said smaller gasket members to said smaller intermediate metal plates until a time after the gasket assembly has been clamped between said head and said manifold, said attachment means comprising a low melting point adhesive applied to the respective sides of said intermediate metal plate to attach said intermediate metal plates and both elongate member and said smaller members until their temperature reaches a predetermined temperature, and thereafter releasing them to slide.

2. A gasket assembly as claimed in claim 1, in which said elongate gasket member and each of said smaller gasket members comprise:

a core steel plate formed with a plurality of hooks; and a packing sheet member of a heat resisting deformable material enveloping therein said core steel plate in such a manner that the hooks lockingly stick in the packing sheet member.

3. A gasket assembly as claimed in claim 2, in which said elongate gasket member has a plurality of pairs of spaced openings formed therein, and each of said smaller gasket members and said intermediate metal plates has a pair of spaced openings formed therein which corresponds to one of the pairs of spaced openings in said elongate gasket member, connecting bolts being able to pass through said spaced openings when said gasket assembly is installed on an engine.

* * * * *

UNITED STATES PATENT AND TRADEMARK OFFICE
CERTIFICATE OF CORRECTION

PATENT NO. : 4,813,687
DATED : March 21, 1989
INVENTOR(S) : Nakayama et al.

It is certified that error appears in the above-identified patent and that said Letters Patent is hereby corrected as shown below:

Title page, items [75] and [73] should read as follows:

[75] Takashi Nakayama, Yokohama;
Takashi Hisatomi, Yokohama;
Shyouzabu Ura, Fujisawa,
all of Japan

[73] Nissan Motor Co., Ltd.

Signed and Sealed this

Thirty-first Day of October, 1989

Attest:

DONALD J. QUIGG

Attesting Officer

Commissioner of Patents and Trademarks